United States Patent
Northcut et al.

(10) Patent No.: US 6,521,124 B2
(45) Date of Patent: Feb. 18, 2003

(54) REVERSE OSMOSIS LIQUID FILTER SYSTEM WITH ULTRAVIOLET FILTRATION

(76) Inventors: Donald A. Northcut, 14041 SW. 320th St., Homestead, FL (US) 33030; Douglas W. Northcut, 14041 SW. 320th St., Homestead, FL (US) 33030

( * ) Notice: Subject to any disclaimer, the term of this patent is extended or adjusted under 35 U.S.C. 154(b) by 0 days.

(21) Appl. No.: 10/179,170

(22) Filed: Jun. 26, 2002

(65) Prior Publication Data

US 2002/0158001 A1 Oct. 31, 2002

Related U.S. Application Data

(63) Continuation-in-part of application No. 09/788,533, filed on Feb. 21, 2001, now Pat. No. 6,423,223, and a continuation-in-part of application No. 09/653,414, filed on Aug. 31, 2000, now abandoned.

(51) Int. Cl.[7] .......................... B01D 27/08; B01D 27/14; B01D 35/30; B01D 61/02
(52) U.S. Cl. ............... 210/232; 210/321.69; 210/323.2; 210/332; 210/453; 210/455; 210/502.1; 210/748; 210/694; 210/652; 422/186.3
(58) Field of Search .............................. 210/232, 323.2, 210/332, 335, 453, 502.1, 321.69, 748, 694, 652, 136, 138, 455; 422/186.3

(56) References Cited

U.S. PATENT DOCUMENTS

| | | | |
|---|---|---|---|
| 30,366 A | 10/1860 | Warne | |
| 136,364 A | 3/1873 | Conger | |
| 3,780,869 A | 12/1973 | Krongos | |
| 6,027,647 A | * | 2/2000 | Northcut et al. ......... 210/323.2 |
| 6,423,223 B1 | * | 7/2002 | Northcut et al. ............ 210/232 |

* cited by examiner

Primary Examiner—Robert Popovics
(74) Attorney, Agent, or Firm—Siemens Patent Services, LC

(57) ABSTRACT

The present invention provides a multi-element filtering system assuring serial filtration of a liquid through multiple filter cartridges while enabling flushing without requiring removal of the filter cartridges. Both conventional and reverse osmosis filtration is performed, sequentially, within the system. After filtration, the water is subjected to ultraviolet irradiation for purification. The filter cartridges are held within a canister which is pressed against the cap and constrained against rotation with the cap. The canister is divided into chambers, and has passages in its floor arranged to enable serial transfer of liquid from one chamber to the next. Flushing employs liquid introduced under normal pressure. Passages leading to the flush liquid outlet enable flushing to proceed when the flush liquid outlet is opened. At other times, filtered liquid will pass through passages leading to the filtered liquid outlet. Liquid is circulated to assure filtration even when flushing, so that contamination of filtered liquid is precluded.

17 Claims, 5 Drawing Sheets

REVERSE OSMOSIS LIQUID FILTER SYSTEM WITH ULTRAVIOLET FILTRATION

CROSS REFERENCE TO RELATED APPLICATIONS

This application is a continuation-in-part of our U.S. patent application Ser. No. 09/788,533, filed on Feb. 21, 2001, entitled "MULTI-ELEMENT Reverse Osmosis, Liquid Filter System with Flushing and Filtering Circuits", now U.S. Pat. No. 6,423,223; which is related to our issued U.S. Pat. No. 6,027,647, with a patent date of Feb. 22, 2000 entitled MULTI-ELEMENT LIQUID FILTER SYSTEM WITH FLUSHING AND FILTERING CIRCUITS; and is a Continuation-In-Part of our U.S. patent application No., 09/653,414, filed on Aug. 31, 2000, now abandoned.

BACKGROUND OF THE INVENTION

1. Field of the Invention

The present invention relates to water filters, and more particularly to a filter housing which accepts multiple, replaceable, reverse osmosis and carbon filter elements within a single housing. The filter elements are disposed in a serial arrangement for filtering purposes. Ultra-violet rays from a central core provide further bacterial purification of filtered water. The housing accommodates flushing without requiring removal OF the filter elements.

2. Description of the Prior Art

In light of many contaminants which may become entrained in water supplied by domestic plumbing systems, it is desirable to filter the water prior to employing the same for human consumption. Many filters are commercial products featuring filter cartridges which are readily installed and serviced by residential occupants who may lack specialized skills as a plumber. These filters conventionally comprise housings which enclose one or more filtering elements. Consequently, separate replaceable filtering elements are readily available from commercial sources.

A filter seen in U.S. Pat. No. 3,780,869, issued to Zaharias Krongos on Dec. 25, 1973, has a housing formed in two threadably mating parts, which housing encloses plural replaceable filter elements. The filter of Krongos lacks the flushing circuitry, reverse osmosis filtering, serial filtration circuitry, UV irradiation, and inlet and outlet arrangement of the present invention.

U.S. Pat. No. 30,366, issued to M. W. Warne on Oct. 9, 1860, shows a vessel having plural compartments, each containing filtration material and connected in series. The device of Warne lacks the reverse osmosis filtration, UV irradiation, flushing circuitry, inlet and outlet arrangement of the present invention, readily replaceable filter cartridges capable of holding their form without supporting, surrounding walls, and adjustable compression of such filter cartridges, all being features of the present invention.

U.S. Pat. No. 136,364, issued to Walter M. Conger on Mar. 4, 1873, illustrates a filter having filter elements disposed in series and also flushing circuitry. However, the device of Conger lacks the threaded, separable, two part housing of the present invention, reverse osmosis filtration, UV irradiation, flushing circuitry contained within a part of the housing, adjustable compression of filter cartridge elements, and the inlet and outlet arrangement, and internal flow scheme of the present invention.

None of the above inventions and patents, taken either singly or in combination, is seen to describe the instant invention as claimed.

SUMMARY OF THE INVENTION

The present invention provides a readily installed and serviceable filter apparatus which employs readily available filter cartridges and which further enables ready flushing. The novel filter apparatus includes a two part housing which can be opened to expose the plural filter cartridges without interrupting liquid connections.

The filter apparatus accepts a plurality of carbon and reverse osmosis filter cartridges. Internal liquid flow circuitry passes water in a serial routing through the several cartridges. This ability may be exploited to subject all water to filters designed to trap different contaminants. An ultra-violet source at the core of the filter housing provides irradiation for additional purification of the filtered water. The filter can be flushed automatically or with minimal difficulty, in particular requiring neither removal of the filter cartridges nor disassembly from the domestic plumbing system. The filter is configured to assure that water employed for flushing will not be discharged in common with filtered water.

Accordingly, it is a principal object of the invention to provide a water filter readily connectable to a domestic plumbing system.

It is another object of the invention to provide a water filter which accepts plural filter elements.

It is a further object of the invention that the filter employ commercially available filter cartridges.

Still another object of the invention is to enable flushing without requiring removal of filter elements.

An additional object of the invention is to prevent water employed to flush the filter from being discharged in common with filtered water.

It is again an object of the invention to provide a filter housing which opens to expose filter elements without requiring disassembly from the domestic plumbing system.

Yet another object of the invention is to enable compression of the housing to secure filter cartridges.

Still another object of the invention is to provide serial and parallel flow through multiple filter cartridges.

Another object of the invention is to provide filtration by reverse osmosis through at least one filter cartridge.

An additional object of the invention is to provide UV irradiation of the water being filtered.

Another object of the invention is to provide improved elements and arrangement thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
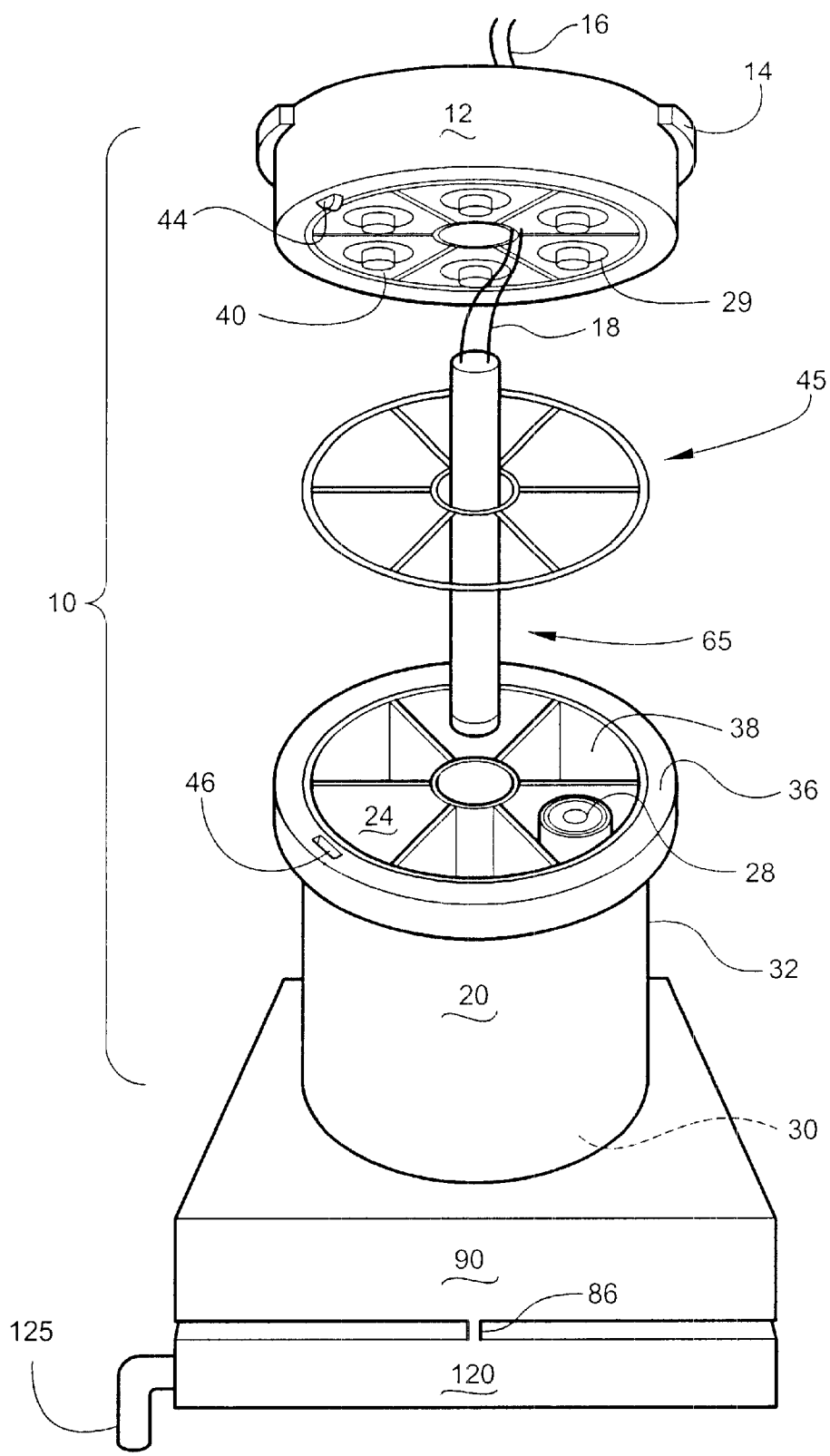
FIG. 1 is an exploded, perspective view of the invention.

Referring now to FIG. 1 of the drawings, a novel multi-element filter system is shown to comprising the filter housing 10, porting block 90, and a tank 120. Electrical feeds 16 supply power to electrical connectors 18 located at the center of the lower surface 42 of cap 12. A canister 20 is divided into six separate chambers, hereinafter collectively referred to as chambers 22, and individually referred to as chambers 22A, B, C, D, E, and F, separated by six internal walls 24. At the juncture of walls 24 is a central tube 26.

Each chamber 22 contains one filter, hereinafter collectively referred to as filter cartridges 28. Each of chambers 22A, 22B, 22D and 22E contain a carbon (charcoal) filter cartridge 28C1–28C4. Each of chambers 22C and 22F contain reverse osmosis filters 28R1 and 28R2. The filter cartridges 28 may be annular, open at the top and at the bottom, and are conventional, commercially available products. Each of the two types of filter cartridges (i.e., carbon and reverse osmosis) may differ in their filtration characteristics despite similar dimensions and configuration.

Cannister 20 has a bottom wall 30 and peripheral wall 32 in fluid connection with porting block 90, and an open top 34 within an upper surface 36. Bottom wall 30 and wall 32 are continuous so as to retain liquid within canister 20. Recess 38 in upper surface 36 of canister 20 and circumferential groove 40 in the lower surface 42 of cap 12 are provided to receive gasket 45. A tab (not shown) on the lower perimeter of gasket 45 fits into a slot (not shown) in recess 38 to ensure proper gasket alignment. Filter cartridges 28 are secured in place by a plurality of filter cartridge retainers 29 located in the lower surface 42 of cap 12 and bottom wall 30 of canister 20.

Position of canister 20 relative to cap 12 is critical to alignment of filter cartridges 28 and filter cartridge retainers 29. Consequently, alignment pin 44 in lower surface 42 of cap 12 fits into alignment aperture 46 in upper surface 36 of canister 20. Cap 12 and canister 20 are joined by bolts (not shown), fitting through apertures (not shown) in the cap 12 and threaded into nuts (not shown) molded into upper surface 36 of canister 20.

Figure 2:
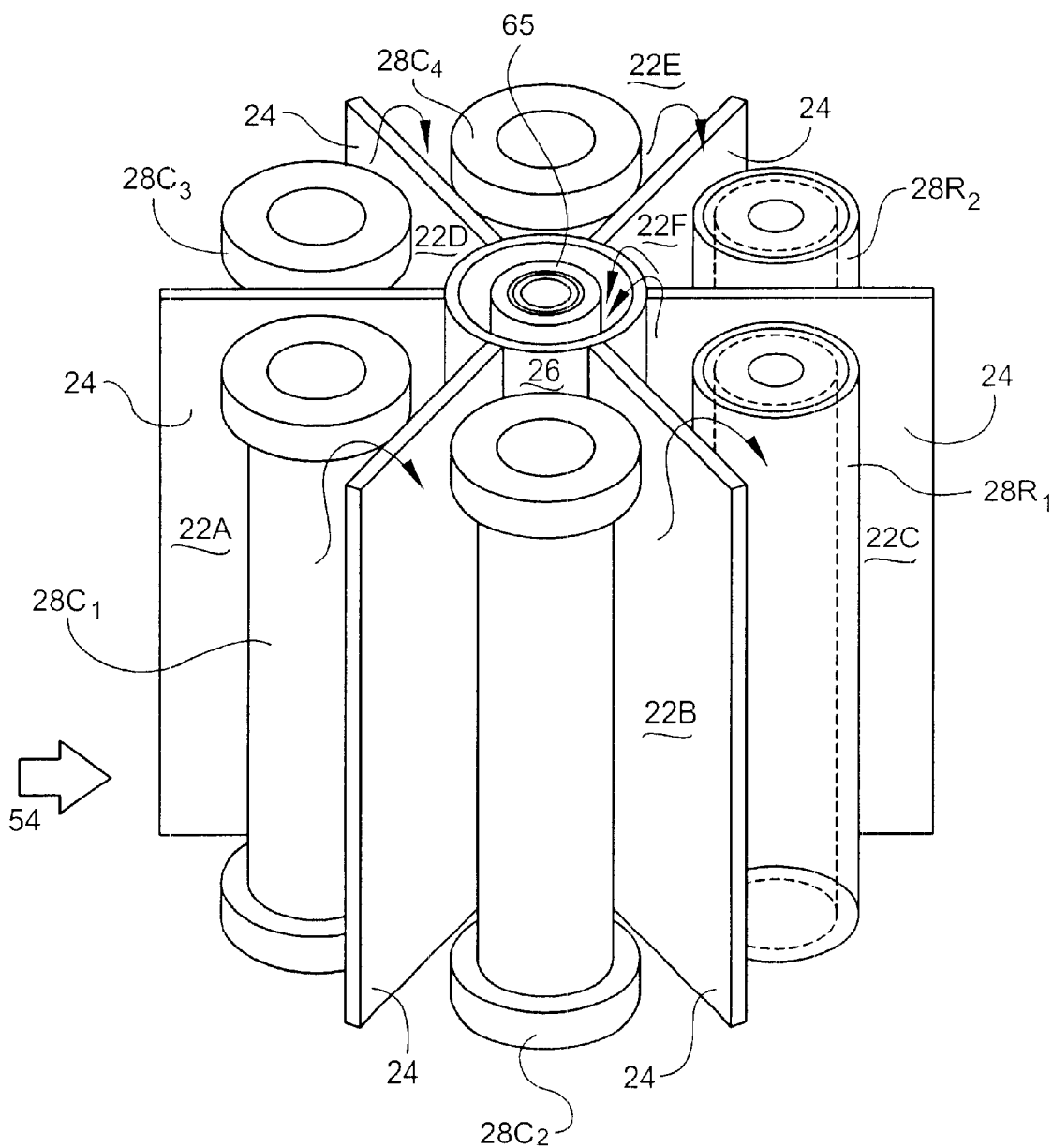
FIG. 2 is an exaggerated, diagrammatic representation of fluid circuitry of liquid being filtered.
Figure 3:
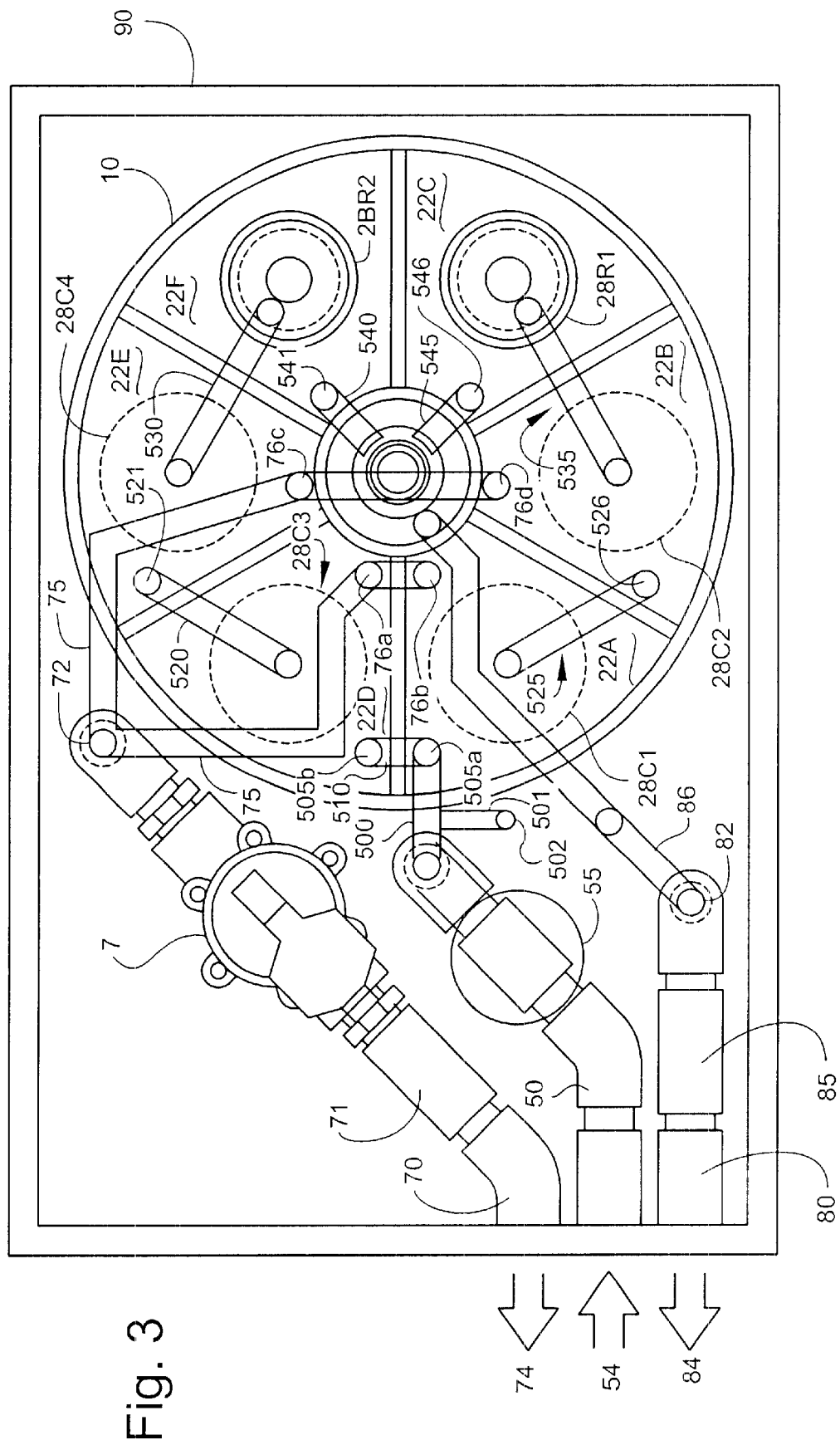
FIG. 3 is a modified plan view of the canister and porting block of the invention showing filtration and flushing passages.

Liquid flow through filter housing 10 is shown in simplified, diagrammatic manner in FIG. 2 and in plan view in FIG. 3. It will be recalled from FIG. 1 that chambers 22 are separated from one another by walls 24. Unfiltered water, as shown by arrow 54, obtained from the domestic water supply passes through an input pipe or conduit 50, through check valve 55 to then transit to inflow ports 505a and 505b and enters chambers 22A and 22D, respectively, from bottom wall 30. A sensor channel 501 is in fluid connection with inflow channel 500 to receive and test the initial contaminants of the domestic water supply by a sensor 502.

Porting block 90 houses all inlet and discharge means by way of pipes or conduits 50, 70 and 80. The porting block 90 also houses all valves, i.e., check valves 55 and 85, and solenoid 7. The pipes and conduits all lead to input and output channels which in turn are in fluid communication with the bottom of the 16 canister 20 to thereby enter the filtration, flushing, and purification circuits.

Water flows in through inflow channel 500 to input ports 505a and 505b into chambers 22A and 22D. As chambers 22A and 22D fill, pressure urges water through the filtering elements 28C1 and 28C3 into he open center of the respective cartridges. Filtered water from filtering element 28C1 and 28C3 then flows through channels 520 and 525, respectively. Filtered water flowing through channel 520 then exits through exit port 521 into chamber 22E. Simultaneously, filtered water flowing through channel 525 exits through exit port 526 into chamber 22B.

As chambers 22B and 22E fill, pressure urges water through filtering elements 28C2 and 28C4 then flows through channels 530 and 535, respectively. Filtered water from chamber 22E is then channeled into the base of reverse osmosis filter 28R2 by way of channel 530. Simultaneously, filtered water from chamber 22B is then channeled into the base of reverse osmosis filter 28R1 by way of channel 535. After reverse osmosis filtration, the filtered water from chamber 22F is channeled onto channel 540 by way of input port 541. Likewise, filtered water from chamber 22C is channeled into channel 545 by way of input port 546.

Figure 4:
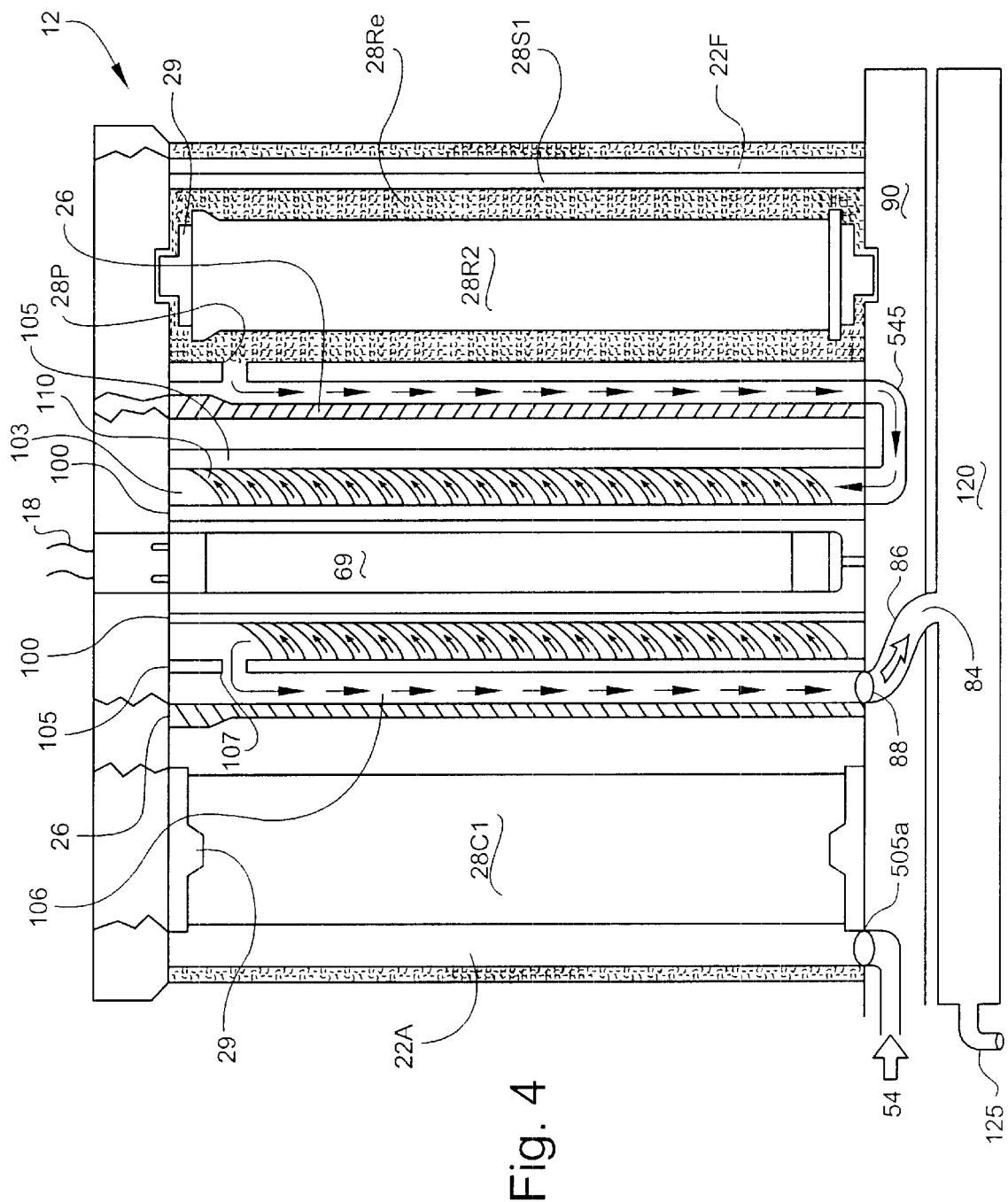
FIG. 4 is a partial cross sectional view of the invention.

Channels 540 and 545 provide the path for the filtered water to enter into the last phase of purification, the UV circuit. Central tube 26 houses the UV irradiation means, i.e., the UV assembly 65, as described in detail herein below. FIG. 4 is a cross sectional view along axis X (shown in phantom on FIG. 3) of chambers 22A and 22F. The UV assembly 65 has an ultra-violet (UV) source 69, which may be a commercially available UV emitting light tube, connected to electrical connector 18.

The UV assembly 65 is comprised of an ultraviolet light source 69 which is surrounded by a UV transmissive wall 100 which seals the UV source 69 from the waterflow. UV radiation emitted by UV source 69 passes through the UV transmissive wall 100 comprised of a quartz material. Exterior to the quartz wall 100 is a second wall 105 comprised of a non-UV transmissive material. Wall 105 is preferably comprised of non-UV transmissive materials such as stainless steel, a sufficiently doped material, or the like, however other suitable materials may be used. Exposing the filtered water to ultraviolet rays provides additional purification to any unfiltered bacteria remaining after the carbon and reverse osmosis filtration.

In the interest of prolonging the exposure of the water to the UV rays, a spiral 110 may be placed between the quartz wall 100 and the stainless steel wall 105. Spiral 110 may be made of any suitable material that is resistant to ultraviolet radiation. Herein, the path that the water travels is increased, thus providing additional, bacterial purification of water passing through the filter device 10.

As can be seen in FIG. 4, the reverse osmosis chamber 22F contains reverse osmosis filter 28R2, which is contained within a cylindrical sleeve 28S1 having external filter elements 28Re surrounding the core of the filter 28R2. Herein, the water traverses the interior space between the sleeve 28S1 and the core of the filter 28R2 for reverse osmosis filtration to then exit out of an exit port 28P. After exiting through exit port 28P, the filtered water then travels through channel 545 for entrance into the purification circuit.

Figure 5:
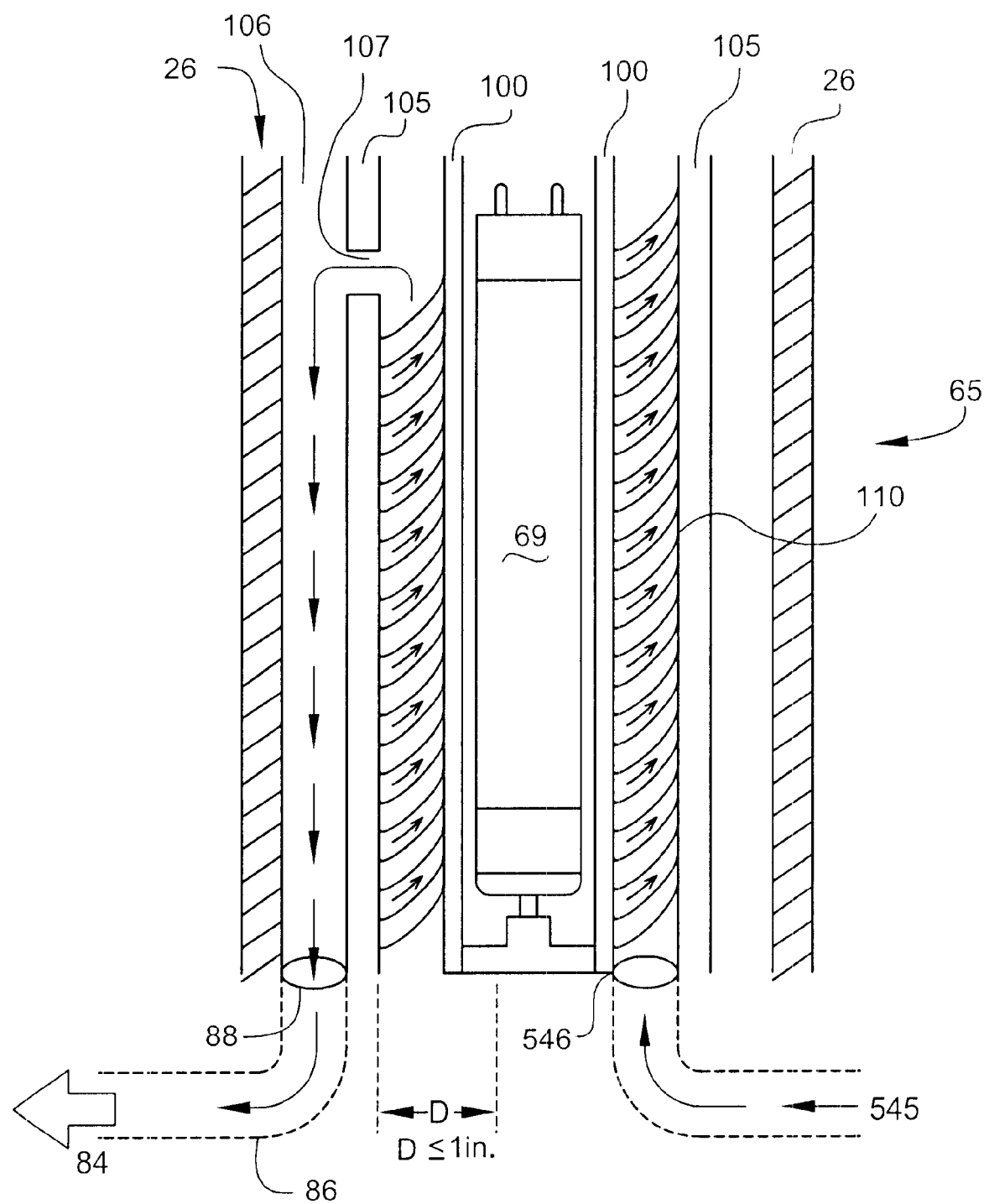
FIG. 5 is a partial cross sectional view showing the UV purification chamber in accordance with the present invention.

FIG. 5 illustrates a cross sectional view showing the UV purification circuit located within central tube 26. In accordance with industry standards, the water being treated by UV rays must be within one inch of the UV source. As depicted in FIG. 5, the variable D denotes the distance between the tube of the UV source 69 and the stainless steel wall 105. With phantom dimension lines, it is shown that $D < 1$ inch.

Also shown in FIG. 5, after the filtered water enters the UV circuit via channel 545 into the UV purification channel 103 to begin the spiraling upwards alongside source 69. The spiraling provides the water with a greater distance to travel during the purification by the UV rays, thus enhancing the purification step. Gasket 45 (as shown in FIG. 1) seals the top of central tube against lower surface 42 of cap 12 providing a fluid seal for each of the chambers, and especially the central tube 26.

The UV treated water then exits out of an aperture 106 located within wall 105 to then travel along UV outflow channel 107 located between wall 105 and central tube 26. With the water flow directions depicted by arrows, it is shown that purified water then exits through port 88, along channel 86, through output port 82 wherein the polished water is carried out via output pipe or conduit 80. Arrow 84 indicated the final product, filtered, purified water.

Better shown in FIG. 4, the filtered, purified final water product, indicated by arrow 84, is then fed into a storage tank 120. The tank 120 may be pressurized. Tank 120 has a final output means, shown diagrammatically as tap 125.

Filter 10 has four, independent flushing zones for removing contaminants from the system. A flushing zone is associated with each of the chambers containing charcoal filters, i.e., chambers 22A, 22B, 22D and 22E, respectively. A flushing pipe or conduit 70 is in fluid communication with a check valve 71, which is connected to a solenoid device 7 which periodically provides back-flushing of the chambers 22A, 22B, 22D and 22E.

The solenoid device 7 is in turn controlled by a suitable control device (not shown). The control device may be a time-clock, a manual switch, or any other device enabling manual or automatic operation of the solenoids. The solenoids of the solenoid device 7 may be in a normally closed state and are energized to an open state. However, it can be appreciated by those of skill in the art that the converse state can alternatively be employed.

The flushing conduit 70 has a main output port 72 for channeling water from flush channel 75. Flush channel 75 has flushing ports 76a–d, each associated with a flush zone as mentioned above. Accordingly, flush port 76a communicates with chamber 22D, flush port 76b communicates with chamber 22A, flush port 76c communicates with chamber 22E and flush port 76d communicates with chamber 22B. The flush circuit is actuated intermittently by solenoid device 7 to prevent contaminants from backing up throughout the filter 10 and water supply lines. Each flushing zone is ultimately connected to the flushing conduit 70 arranged to discharge flushing water to a suitable drain, (not shown) or other facility for disposal.

The present invention is susceptible to variations and modifications which may be introduced without departing from the inventive concept. Several examples of modifications will be set forth. Direction of flow of water is indicated by arrows. It should be noted that for simplification of the figures, the positioning of external connections in all drawings are illustrative and do not indicate exact alignments. The filter system 10 may be provided with any number of chambers 22 and appropriate fluid circuitry to accommodate any number of filter cartridges 28. Bolts and nuts (not shown) joining cap 12 and canister 20 could be replaced by latching arms (not shown) or other fastening elements which could serve in their place.

It is to be understood that the present invention is not limited to the embodiments described above, but encompasses any and all embodiments within the scope of the following claims.

What is claimed is:

1. A multi-element filter system, comprising:
   a) a canister comprising:
      a solid bottom wall,
      a peripheral wall disposed substantially perpendicular to said bottom, said bottom wall and said peripheral wall defining an enclosed space adapted to contain a liquid,
      a plurality of internal walls dividing said canister into a plurality of separated chambers,
      a central, vertical tube formed at the juncture of said internal walls,
      a cap, removably affixed to said peripheral wall,
      a gasket disposed between said cap and said peripheral wall and said central, vertical tube to form a liquid seal therebetween;
      a plurality of filter elements, each one of said plurality of filter elements being disposed in each of said separated chambers;
   wherein said plurality of filter elements each contain filtering means to provide fluid filtration;
   b) a porting block containing inlet and discharge means in fluid communication with said plurality of filtration elements and said plurality of separate chambers for conducting liquid to, and receiving a liquid from said filter system;
   c) a tank in fluid communication with the porting block for storing finally processed water.

2. A multi-element filter system, as defined in claim 1, further comprising:
   flushing means for flushing contaminants from said chambers and said filter elements.

3. A multi-element filter system, as defined in claim 2, wherein at least one of said plurality of filter elements comprises a reverse osmosis filter.

4. A multi-element filter system, as defined in claim 3, wherein at least one of said plurality of filter elements comprises a carbon filter.

5. A multi-element filter system, as defined in claim 4, wherein located within the walls of said central, vertical tube are:
   a) a non-UV transmissive tube surrounding
   b) a UV transmissive tube, said UV transmissive tube sealingly surrounding
   c) a UV source.

6. A multi-element filter system, as defined in claim 5, wherein a spiral is located between said non-UV transmissive tube and said UV transmissive tube.

7. A multi-element filter system, as defined in claim 6, wherein said UV transmissive tube is a quartz material.

8. A multi-element filter system, as defined in claim 7, wherein said non-UV transmissive tube is a stainless steel material.

9. A multi-element filter system, as defined in claim 8, wherein said flushing means further comprises flushing channels in fluid communication with said carbon filters.

10. A reverse osmosis purification system comprising:
   a) a housing, said housing having a solid bottom wall and a peripheral wall,
      said peripheral wall disposed substantially perpendicular to said bottom, said bottom wall and said peripheral wall defining an enclosed space adapted to contain a liquid,
      a plurality of internal walls dividing said housing into a plurality of separated chambers,
      a central, vertical tube formed at the juncture of said internal walls, a cap, removably affixed to said peripheral wall, a gasket disposed between said cap and said peripheral wall and said central, vertical tube to form a liquid seal therebetween;

filtration means located within the chambers of said cannister for filtering water flowing through said chambers, purification means located within the central tube for killing bacteria and thus purifying water flowing through said central tube, flushing means in fluid communication with said filtration means for providing flushing of said filtration means and thereby cleaning said filtration means;

b) a porting block containing inlet and discharge means in fluid communication with said plurality of filtration elements and said plurality of separate chambers for conducting liquid to, and receiving a liquid from said filter system; and c) a tank in fluid communication with the porting block for storing finally processed water.

11. The reverse osmosis purification system of claim 10 wherein said filtration means comprises a plurality of filter elements each located within a chamber of said housing.

12. The reverse osmosis purification system of claim 11 wherein said filter element comprises at least one reverse osmosis filter.

13. The reverse osmosis purification system of claim 12 wherein said filter element comprises at least one carbon filter.

14. The reverse osmosis purification system of claim 13 wherein said purification means comprises an ultraviolet irradiation source sealingly surrounded by an ultraviolet light transmissive tube.

15. The reverse osmosis purification system of claim 14 wherein said ultraviolet light transmissive tube is surrounded by a non-ultraviolet light transmissive tube, and wherein said non-ultraviolet light transmissive tube is located such that the water travels within one inch of the ultraviolet light source.

16. The reverse osmosis purification system of claim 15 wherein said flushing means comprises fluid channels in communication with said carbon filters for flushing and thus cleaning said carbon filters.

17. The reverse osmosis purification system of claim 16, wherein said purification means comprises a spiral means located between said non-ultraviolet light transmissive tube for providing a greater travel path for water flowing therethrough.

* * * * *